(12) United States Patent
Ashley et al.

(10) Patent No.: US 7,518,097 B2
(45) Date of Patent: Apr. 14, 2009

(54) RECONFIGURABLE IMAGING SYSTEM

(75) Inventors: Paul R. Ashley, Toney, AL (US); William C. Pittman, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 12/062,991

(22) Filed: Apr. 4, 2008

(65) Prior Publication Data
US 2008/0185503 A1 Aug. 7, 2008

Related U.S. Application Data

(62) Division of application No. 11/225,405, filed on Sep. 13, 2005, now Pat. No. 7,381,937.

(51) Int. Cl.
*H01J 5/16* (2006.01)
*H01L 27/00* (2006.01)
(52) U.S. Cl. ............ 250/216; 250/208.1; 348/369
(58) Field of Classification Search ......... 250/208.1, 250/216; 348/369
See application file for complete search history.

(56) References Cited

U.S. PATENT DOCUMENTS

| | | | | |
|---|---|---|---|---|
| 5,543,954 A | * | 8/1996 | Nicholson | 359/201 |
| 5,705,806 A | * | 1/1998 | Matsuda et al. | 250/208.1 |
| 6,229,136 B1 | * | 5/2001 | Banks | 250/216 |
| 6,897,464 B2 | * | 5/2005 | Trzecieski | 250/559.3 |
| 7,123,829 B2 | * | 10/2006 | Ohsuga | 396/301 |
| 7,381,937 B2 | * | 6/2008 | Ashley et al. | 250/208.1 |
| 2005/0238348 A1 | * | 10/2005 | Oh | 396/451 |
| 2006/0291077 A1 | * | 12/2006 | Shim et al. | 359/819 |
| 2008/0185503 A1 | * | 8/2008 | Ashley et al. | 250/216 |
| 2008/0211955 A1 | * | 9/2008 | Avital et al. | 348/335 |

* cited by examiner

*Primary Examiner*—John R Lee
(74) *Attorney, Agent, or Firm*—Michael K. Gray

(57) ABSTRACT

An image analysis and enhancement system is provided with an image processor, imaging metrics, an image storage depository, and a reconfigurable sensor device that can be present at the same location. A remote reconfigurable sensor device is connected to the image processor via a communication link. Both the reconfigurable sensor device and the remote reconfigurable sensor device are equipped with selectable optical elements and imaging elements that are selected in a desired combination and orientation to capture desired image frames from a target scene or object. The selectable optical and imaging elements are provided with actuating devices to move and translate the selected optical and imaging elements into a desired orientation with one another, so that a desired imaging technique can be employed to obtain an enhanced image. The system is applicable to industrial, medical and military use.

20 Claims, 10 Drawing Sheets

RECONFIGURABLE IMAGING SYSTEM

This is a divisional of non-provisional application Ser. No. 11/225,405 for "IMAGE ANALYSIS AND ENHANCEMENT SYSTEM" filed on Sep. 13, 2005.

DEDICATORY CLAUSE

The invention described herein may be manufactured, used and licensed by or for the U.S. Government for governmental purposes without payment of any royalties thereon.

BACKGROUND OF THE INVENTION

1. Field of the Invention

The present invention pertains to the field of imaging. More particularly, the present invention relates to a system of imaging that utilizes a plurality of image collection hardware elements that can be selectively employed to give a desired image configuration for a desired imaging technique.

2. Discussion of the Background

The prior art demonstrates a number of techniques used for image processing. These techniques involve configuring and then reconfiguring an image to achieve an improved image, i.e., an image reconfiguration.

For example, it is well established that contrast is reduced when a scene is viewed through a medium with suspended particles in it, but contrast can be enhanced by viewing the scene through two orthogonal polarizations, then taking the difference between the two polarized scenes. Taking the difference between the two polarizations has the effect of reducing the scattering, thus enhancing the contrast. The medium could be the earth's atmosphere filled with dust, or aerosols or a piece of biological tissue viewed through a microscope. U.S. Pat. No. 5,975,702 to Pugh, Jr. et al. that issued Nov. 2, 1999 and which is herein incorporated by reference demonstrates this method of polarization differencing.

The ability to collect a large number of narrow hyperspectral images of the same scenes allows one to then select the best set of a smaller number of bands that give the best signal to noise ratio, and the bands need not may be contiguous.

A well established art in the field of hyperspectral imaging has been made possible by the voltage controlled acousto-optical tunable filter. The imagery that can be collected through such tunable filters can be quite varied—from topographical scenes to the imaging of biological specimens.

Acousto-optic tunable filters (AOTF's) are taught in U.S. Pat. No. 4,720,177, U.S. Pat. No. 4,685,772 and U.S. Pat. No. 5,329,397 to Chang which issued on Jan. 19, 1988, Aug. 11, 1987, and Jul. 12, 1994, respectively, the teachings of which are herein incorporated by reference. In U.S. Pat. No. 5,576,880 that issued Nov. 19, 1996, and which is herein incorporated by reference as well, Chang teaches an acoustic-optic modulator. AOTF's are used in a variety of imaging and display systems. An example of a display system utilizing an AOTF is U.S. Pat. No. 5,410,371 to Lambert which issued on Apr. 25, 1995, the teachings of which are herein incorporated by reference.

Another imaging technique has been to obtain an in-focus image and an out-of-focus image and then subtract the out-of-focus image from the in-focus image to obtain an enhanced image by removing the lower frequency components. This concept is disclosed in U.S. Pat. No. 6,433,325 to Trigg which issued on Aug. 13, 2002 the teachings of which are herein incorporated by reference. FIG. 1 demonstrates an embodiment from the Trigg patent in which a microscope body 18 having an optically aligned lens 14 and focal array 16 is operably connected to a ball screw assembly 20 that is driven by a motor 22 and controlled by a computer 24. A sample 12 resting on a sample stage 10 can be brought in and out of focus by the operation of the ball screw assembly.

The highest frequency component that can be captured in a focal plane array is limited by the detector pitch, or the spacing between the centers of the pixel elements. Under the Nyquist criteria, the highest frequency that a band-limited spectra can contain to be fully recoverable is one half the sampling rate, which in the case of the staring focal plane array is one half of the detector pitch.

Since infrared scenes typically contain frequencies higher than one half the sampling rate of the focal plane array, the result is aliasing, or the overlap of adjacent spectra leading to distortion of the sampled signals and the loss of information in the reconstruction process.

The reduction in distortion from aliasing can be achieved by a process of microscanning that shifts the image plane a fraction of the detector pitch in two coordinates over the focal plane array. This technique allows the capture of higher frequency components in an image that would otherwise be lost in distortion. The technique is presented in U.S. Pat. No. 5,774,179 to Chevrette et al. that issued on Jun. 30, 1998, the teachings of which are hereby incorporated by reference.

To establish some measure of quality of an image, a conceptual ruler or metric is needed. One commonly used metric in image analysis that has been used is the peak signal to noise ratio (PSNR).

If one image is defined as the reference image, then the degree of dissimilarity with a comparison image is given in terms of a distance measure or error. The most obvious measure of distance between two images is obtained by comparing them on a pixel-by-pixel basis and taking the difference between the pixel values (pixel difference metrics). For example, if a sensor device collects an image and it is compressed for transmission, and then decompressed, the decompressed image will differ from the original image by the errors or artifacts introduced by the compression-decompression process.

The variety of image similarity metrics previously used in imaging technology, has included spectral angle mapping, Euclidian distance and others. These metrics have ambiguities, and efforts have been made to improve them with something called a "spectral similarity scale". A method for determining spectral similarity is disclosed in U.S. Pat. No. 6,763,136 that issued to Sweet on Jul. 13, 2004 which is hereby incorporated by reference.

In that the type of image that is desired and the circumstances and conditions under which an image is obtained can vary greatly, a need is seen for an image analysis and enhancement system that has the ability to utilize a multiplicity of imaging techniques positioned at local and/or remote locations.

SUMMARY OF THE INVENTION

Accordingly, one object of the present invention is to provide an image analysis and enhancement system that is able to selectively employ a plurality of optical element and imaging elements for obtaining desired imaging frames.

Another object of the present invention is to provide a centralized or local image enhancement center that is equipped to process images utilizing a variety of techniques.

Another object of the present invention is to allow for image processing of images obtained from different locations at a central image enhancement center.

Still another object of the present invention is to realize new imaging techniques made possible by the interchangeability of respective optical and imaging elements utilized by the present invention.

These and other valuable objects are achieved by an image analysis and enhancement system having an on-location-imaging center having an image processor that interfaces with imaging metrics. The image processor is provided with software for implementing a variety of imaging techniques. An image depository is connected to the image processor for storing collected image frames. Control means including controlling software and a keyboard input means are connected to the image processor. A display for viewing the processed and enhanced images is connected to the image processor. A reconfigurable sensor system or device is connected to the image processor with the reconfigurable sensor device having a plurality of optical and image collecting elements which can be selectively arranged for purposes of obtaining an image to be processed by a predetermined imaging technique.

At least one remote reconfigurable system or device may be connected to the image processor by means of a communication link. The remote reconfigurable system is likewise provided with a plurality of optical and imaging elements that can be selectively arranged for purposes of obtaining an image to be processed by a predetermined imaging technique.

The remote reconfigurable sensor device can be placed at a remote geographical location on a platform, vehicle or aircraft at the remote location. Accordingly, the remote reconfigurable sensor device can interface with a local command imaging center that is many miles away. The remote and local reconfigurable sensor devices can be used for various applications including military, industrial and medical applications.

The hardware included in the reconfigurable sensor devices includes at least one optical member or lens, means for polarizing an image at more than one angular orientation, a hyperspectral filter, and a focal plane array. Means are provided to change the pitch of the optical member, and means are provided to translate and move the hyperspectral filter, polarizing means and focal plane into desired imaging orientations. Still further, means are provided so the hyperspectral filter, polarizing means and focal plane array can be selectively utilized.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings described below.

DESCRIPTION OF THE PREFERRED EMBODIMENTS

Figure 1:
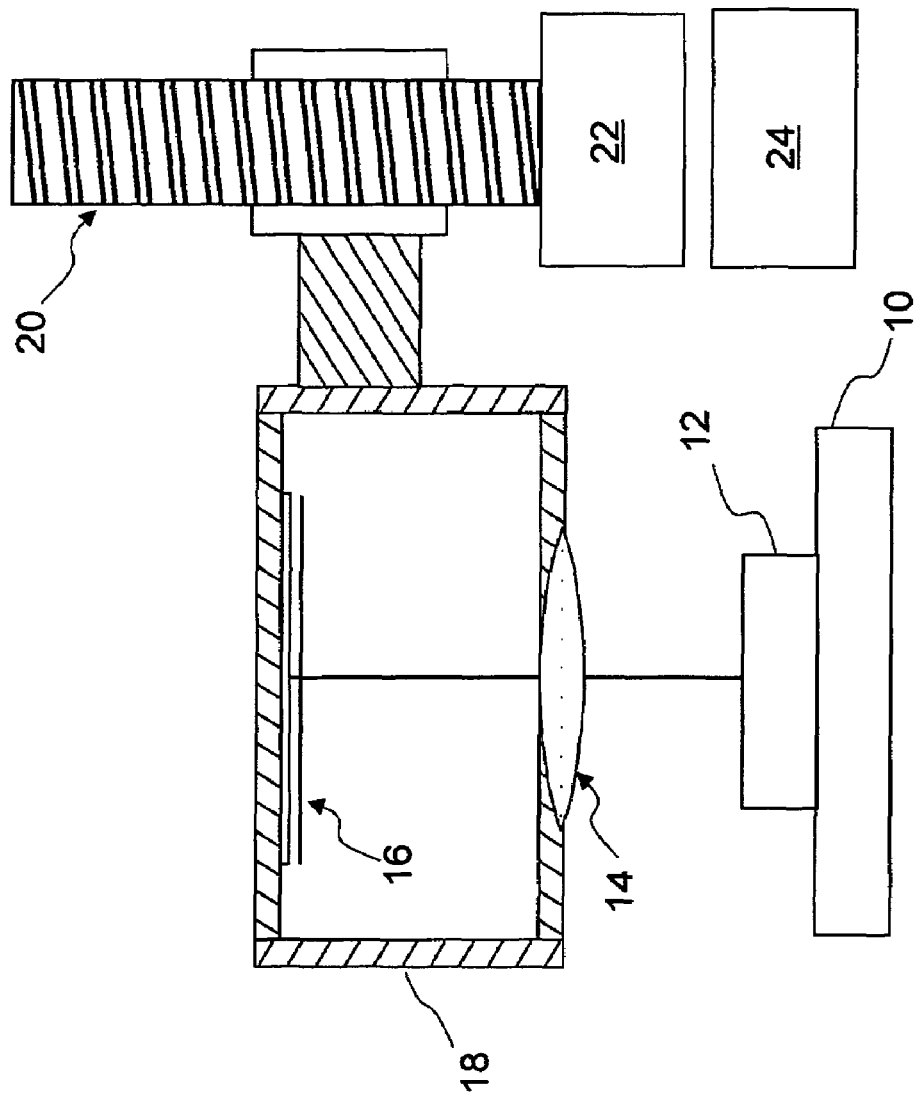
FIG. 1 is a schematic illustration of a prior art device used for image enhancement.
Figure 2:
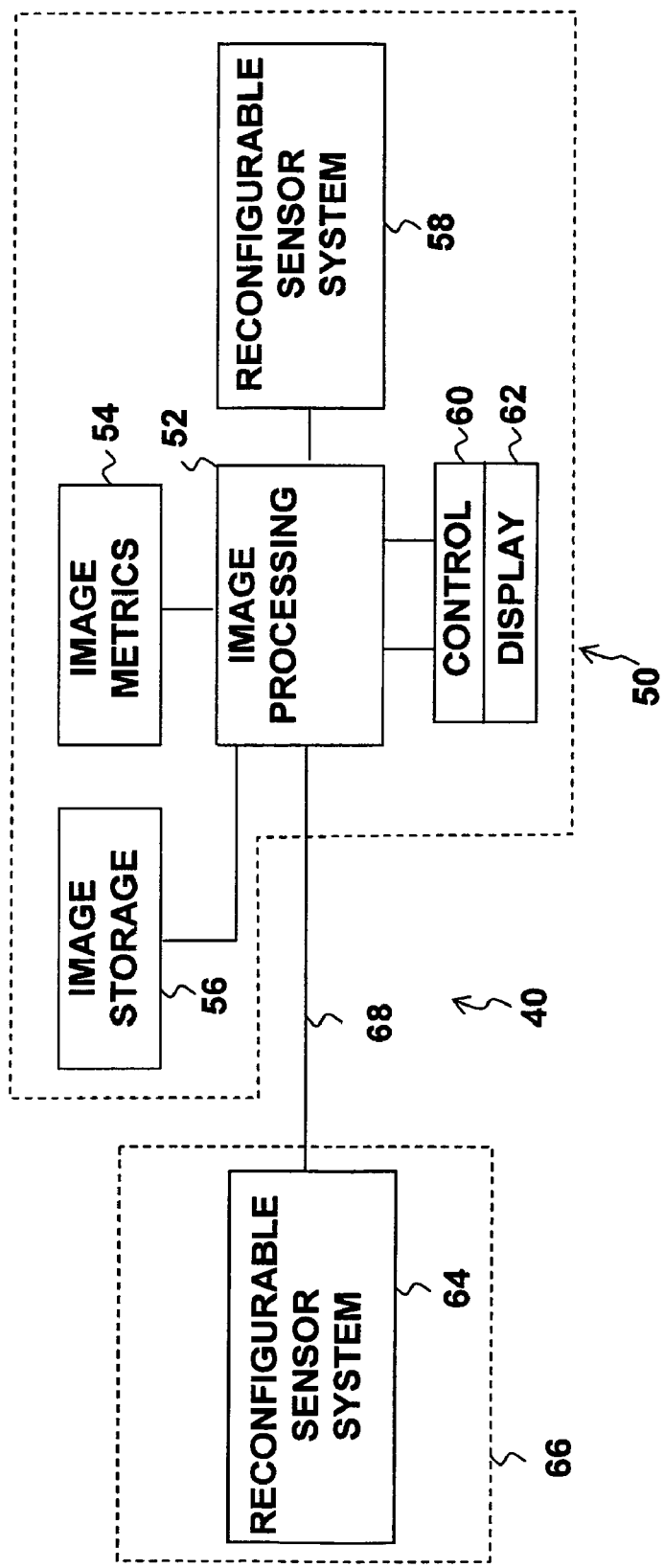
FIG. 2 is a schematic block diagram of the image analysis and enhancement system according to the present invention.

Referring now to the drawings, wherein like reference numerals designate identical or corresponding parts throughout the several views, and, more particularly to FIG. 2 thereof, an image analysis and enhancement center 50 of an image enhancement and analysis system 40 is provided with an image processor or central processing unit 52. Imaging metrics 54 connect and interface with the image processor 52. The imaging metrics 54 may include any number of software-based metrics utilized for imaging. An image depository or image storage or memory unit 56 is connected and interfaces with the image processor 50. A reconfigurable sensor device or system 58, which may be comprised of many components, is used to obtain various configurations of images of a target object for processing by the image processor 52.

Imaging can be initiated and controlled by a controller 60 which can include a keyboard for interfacing with the image processor 52. A display 62 is connected to the image processor 52. The display can be one of various varieties of computer-type monitors. A printer device (not shown) can be connected to the image processor as well.

The image processor 52, imaging metrics 54, image depository 56 and reconfigurable sensor device 58, as well as control 60 and display 62 are all located in an image analysis and enhancement center 50. The respective elements of the image analysis and enhancement center can be accommodated in a small room.

A remote reconfigurable sensor device 64 positioned at a remote location 66 is connected to the image processor 52 through a communication link 68. The communication link can be a fiber optic link, a satellite feed, or other appropriate link for channeling image data from the remote reconfigurable sensor device 64 to the image processor 52. This remote reconfigurable sensor device 64 may be located hundreds or even thousands of miles from the image processor 52.

The images collected by the reconfigurable sensors, 58, 64 are delivered to the signal processor for image processing. The software provided for the signal processor can include such processing tools as segmentation, edge detection, image restoration, image fusion, image enhancement, image compression, and image comparison, and image comparison with images from storage.

Tools derived from multi-resolution theory allow the decomposition of an image into different resolution levels, then operations on the selected resolution level are followed by reconstruction.

The software employed by the image processor can include software for realizing Fourier and wavelet transformations of the image data. Examples of imaging that utilize wavelet transformation are disclosed in U.S. Pat. No. 6,094,050 that issued to Zaroubi et al. on Jul. 25, 2000 and in U.S. Pat. No. 6,751,363 that issued to Natsev at al. on Jun. 15, 2004 both of which are herein incorporated by reference.

The Fourier transform can characterize the resolution of an image only on the dimension of wavelength. On the other hand, the wavelet transform can characterize resolution in both the frequency and spatial dimension and provides many tools and possibilities for utilization by the image processor 52.

Wavelets extend the power of the Fourier transform and its inverse as a tool for analysis and synthesis of signals. The Fourier transform has only two building blocks ("basis functions") for these processes: sines and cosines. Since these functions are continuous from −infinity to +infinity, the only kind of signals that the Fourier transform can deal with is PERIODIC signals. Wavelets on the other hand are designed for processes of analysis and synthesis of TRANSIENT signals or signals with DISCONTINUITIES.

In contrast with the Fourier transform and its inverse, wavelets have a practically unlimited number of building blocks (or "basis functions"). This has provided a gold mine for mathematicians, physicists and engineers in formulating new wavelet tools for signal processing functions. The great power of wavelets in two-dimensional image processing is the ability to DETECT LOCALIZED EDGES in the image. One specific application that has attracted widespread attention is the conversion of 29 million inked fingerprint card files in the FBI Criminal Justice Information Services to electronic form for quick retrieval and search of the database by automated fingerprint identification systems. This conversion technique which allows for quick retrieval by automated means is accomplished by means of wavelets.

Figure 3:
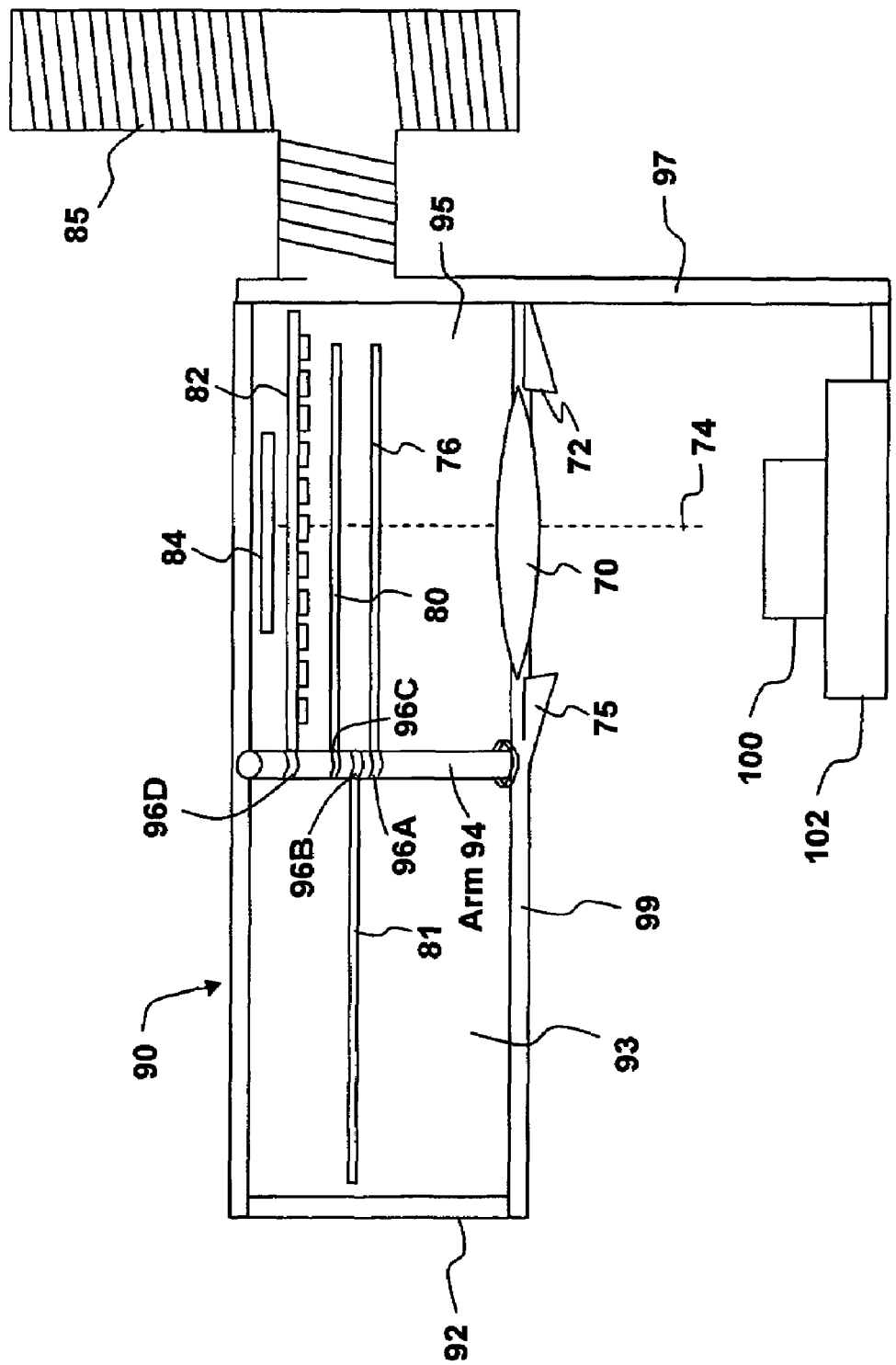
FIG. 3 is a cutaway side-view illustration of a reconfigurable sensor device according to one embodiment of the present invention.

With reference to FIG. 3, a microscope-type reconfigurable image-enhancement sensor device 90 is provided with an optical lens or member 70 that is supported on an actuator frame 75 provided with optical actuators 72. The actuator frame 75 extends from a lower support member 99 of a support body 92 that is supported by support member 98.

A support arm 94 extends from the lower support member 99. A support body elevation-control mechanism 85 can be employed to raise and lower the support body so that the optical member 70 is positioned at a desired focal position.

Figure 6:
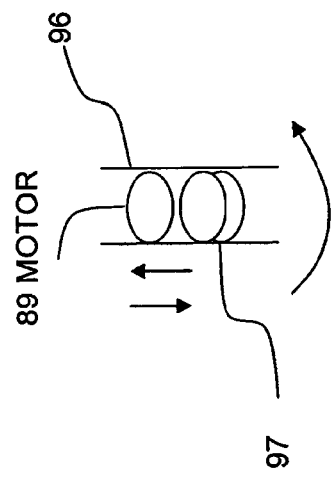
FIG. 6 is a schematic illustration of a translatable actuating element according to the embodiment of the present invention shown in FIG. 3.

The support arm 94 is provided with a plurality of translatable optical element actuators 96A, 96B, 96C. 96D (FIG. 6) which are further discussed below. A hyperspectral filter 76, polarizer 80, and focal plane array 82, and auxiliary detector 84 are optically aligned on an optical axis 74 with optical member 70. (The detector 84 is utilized to capture a visual image when the focal plane array is not utilized). The optical axis 74 extends to a target sample 100 that is positioned on a support member 102.

Figure 5:
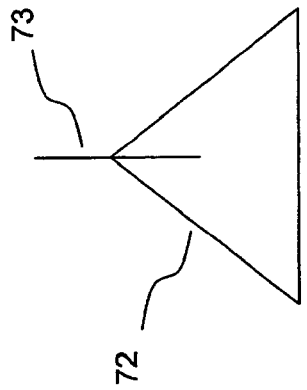
FIG. 5 is a schematic illustration of an optical actuator demonstrated in FIGS. 3 and 4.
Figure 4:
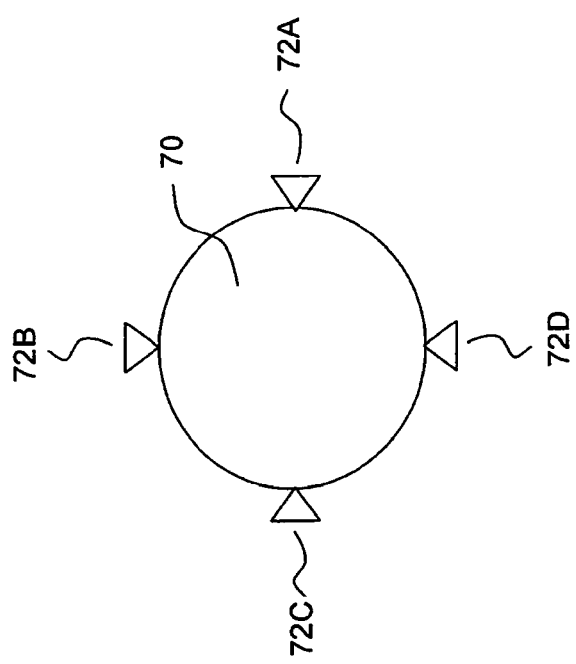
FIG. 4 is a top view of a lens provided with optical actuators according to the embodiment of the present invention shown in FIG. 3.

In FIG. 4, a top view shows that the optical member 70 is supported by a plurality of actuators 72A, 72B, 72C, and 72D that can be utilized to change the pitch of the optical member in two coordinates. Each actuator 72 is provided with an actuating finger 73 (FIG. 5) that can be moved backwards and forwards as desired by piezo-electric or other equivalent means. Since each finger 73 is at an angle with lens 70, this allows incremental lateral and upward and downward movement of the lens so as to enhance microscanning capability.

The support arm 94 is used to support hyperspectral filter 76, polarizer 80, polarizer 81, and focal plane array 82. On the support arm 94, actuator 96A is connected to hyperspectral filter 76, actuator 96B is connected to polarizer 81, actuator 96C is connected to polarizer 80 and actuator 96D is connected to focal plane array 82. These actuators allow filter 76, polarizers 80 and 81, and focal plane array 82 to be moved in incremental distances in both the lateral direction and vertical directions. Further, the actuators 96A, 96B, 96C, 96D allow the filter 76, polarizers 80 and 81, and focal plane array 82 to be rotated from a position in the focal section 95 of the support body to a storage section 93 of the support body.

Filter 76, polarizers 80 and 81, and focal plane array 82 can be selectively utilized as needed for a desired imaging function. For example, polarizer 80 can be used separately and then in conjunction with polarizer 81 to change the polarization angle of a first and then a second image frame. Each translatable actuator 96 (FIG. 6) is provided with a motor 89 that is connected for the lateral rotation of the given optical element, i.e., the filter 76, polarizers 80 and 81, and focal plane array 82.

Further, each translatable actuator 96 is provided with a piezo-electric vertical actuator 97 which can incrementally change the incremental up and down orientation of the optical element. Depending on the scale of the reconfigurable sensor device of FIG. 3, MEMS (Microelectromechanical System) technology can be utilized in the fabrication of the respective actuators of the device. Thus, filter 76, polarizers 80 and 81 and focal plane array 82 may be activated to move both laterally and vertically.

The arrangement and selection possibilities of the respective optical and imaging elements of the reconfigurable sensors, 58, 64 are such that uses of the sensor devices include: 1) collecting and storing images in narrow hyperspectral bands of the same scene; 2) collecting and storing orthogonally polarized images of the same scene; 3) collecting and storing images of different resolutions of the same scene; and 4) microscanning an image to capture higher frequencies in the same scene than the sampling rate of the focal plane allows in a stationary position. —These are but a few of the applications for which the reconfigurable sensor systems of the present invention can be utilized.

Figure 7:
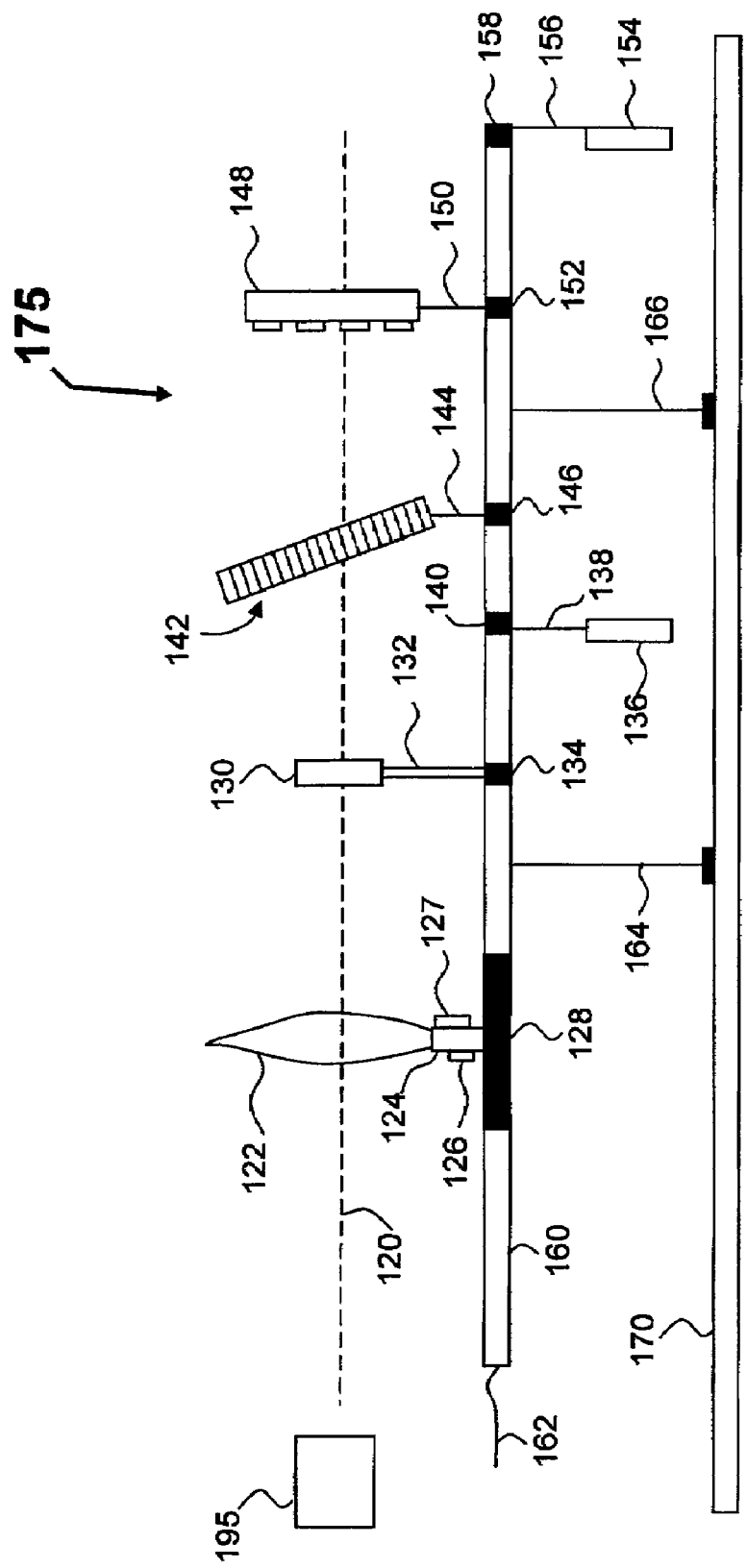
FIG. 7 is a schematic illustration of another embodiment of an optical sensor system that is adaptable for utilization with a plurality of sensor enhancement techniques.

With reference to FIG. 7, a selectively adaptable optical sensor system 175 which can be utilized as a reconfigurable system 58, 64 (FIG. 2) is provided with elongate support 160 that connects to power and communication link 162. The elongate support 160 is fastened to foundation 170 by fasteners 164 and 166. Selective locations of the elongate support 160 are provided with a plurality of rotatable motors represented by motors 128, 134, 140, 146, 152 and 158 that provide for the rotation of optical elements about an axis of the elongate support 160.

Rotatable motor 128 connects to support arm 124 on which an optical element or lens 122 is positioned. The lens 122 in FIG. 7 is aligned with a target object 195 along an optical axis 120. Vertical actuator 126 and lateral actuator 127 are provided on a support arm 124 for providing incremental changes in the vertical and/or lateral position of the lens 122. Actuators 126 and 127 are piezo-electric actuators or their equivalent. Rotatable motor 128 may be further provided with gearing or with piezo-electric, magnetic or other equivalent means for horizontal movement of support 124 along the horizontal axis of elongate support 160. This allows the lens 122 to be capable of three-coordinate movement.

Still with reference to FIG. 7, rotatable motor 134 is connected to support arm 132 that connects to polarizer 130 and rotatable motor 140 is connected to a second polarizer 136 by support arm 138 thereby allowing the respective polarizers to be moved within and out of the optical path 120 as desired. Rotatable motor 146 is connected to a support arm 144 that connects to filter 142 (an AOTF non-collinear filter is depicted in FIG. 7). Upshifted, undiffracted and downshifted beams of light emanate from the filter 142. The filtered light can then be detected by focal plane detector 148 which is connected to support arm 150. Rotatable motor 152 allows the focal plane detector to be rotated to a desired location for detecting the filtered light beams. An auxiliary detector 154 is connected by support arm 156 to rotatable motor 158. The auxiliary detector can be utilized, if desired, as the operational light detecting element. Thus, by selectively utilizing the respective optical elements in a desired arrangement along optical path 120, a desired imaging technique can be realized.

If the sensor system 175 is used as or as part of the reconfigurable sensor device or system 58 of the local image analysis and enhancement center 50, the image processor 52 and control 60 can be used to actuate and control the sensor system 175. If the sensor system 175 is used as part of a remote system 64, the central image processor 52 and control 60 can be used to actuate and control the remote sensor system or, alternatively, a personal computer can be used for controlling the remote sensor system.

In that the sensor systems of the present invention can be adapted to conform to a variety of optical arrangements, a great number of imaging techniques can be used in conjunction with the present invention.

Figure 8:
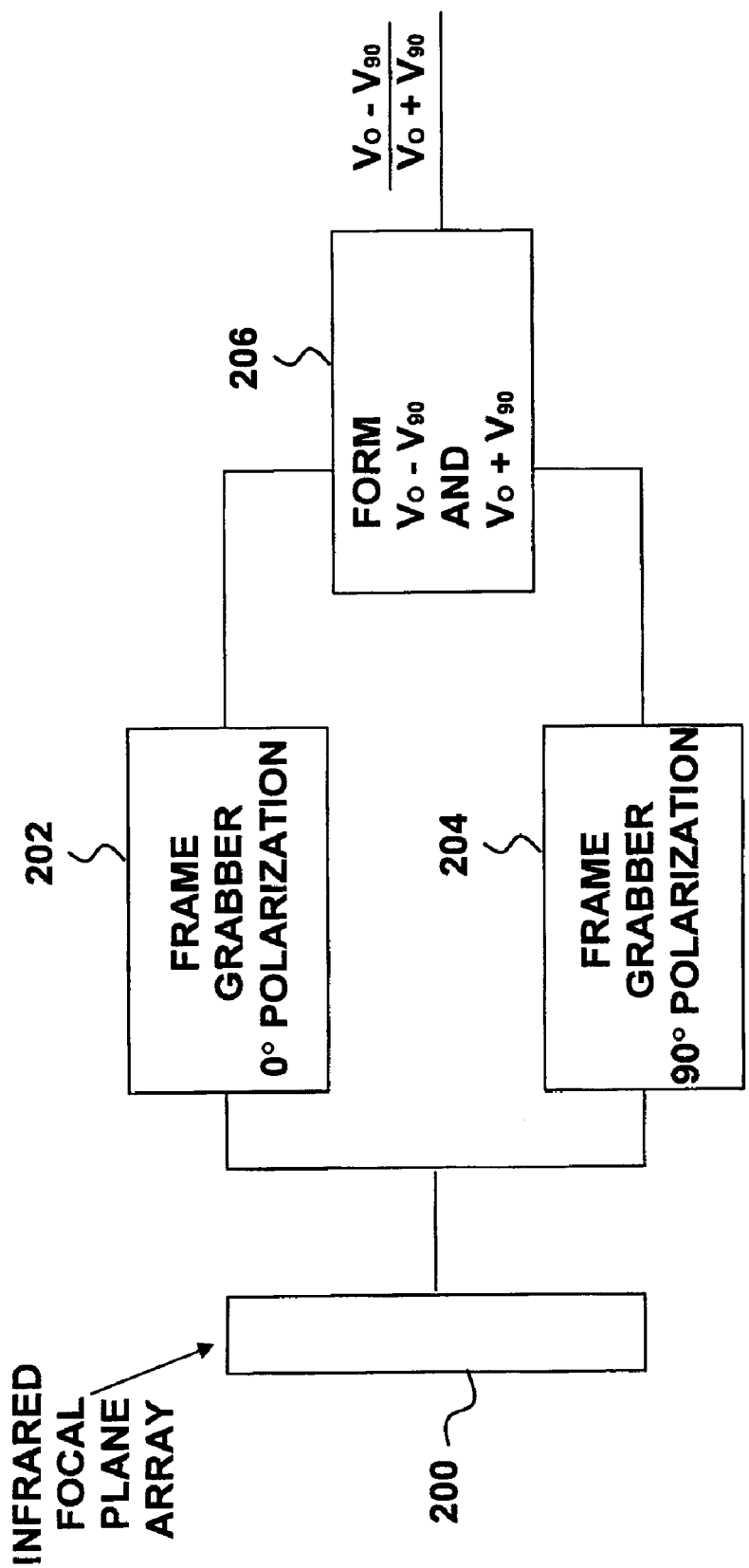
FIG. 8 is a block diagram that illustrates an image enhancement technique that can be utilized by the present invention.

In FIG. 8, an infrared focal array 200 is depicted which corresponds to the focal array 82 (FIG. 3) and focal array 148 (FIG. 7). In a first step 202, the infrared focal array 200 transmits an image frame at 0° polarization and in a second step 204 transmits a second image frame at 90° polarization. The image processor 52 grabs a frame of a target image at 0° polarization represented by an image signal $V_0$ and then grabs a frame of a target image at 90° polarization represented by an image signal $V_{90}$. In a third step 206, the respective target images represented by image signals $V_0$ and $V_{90}$ are used to assemble an enhanced image formulated by the expression $(V_0-V_{90})/(V_0+V_{90})$.

Figure 9:
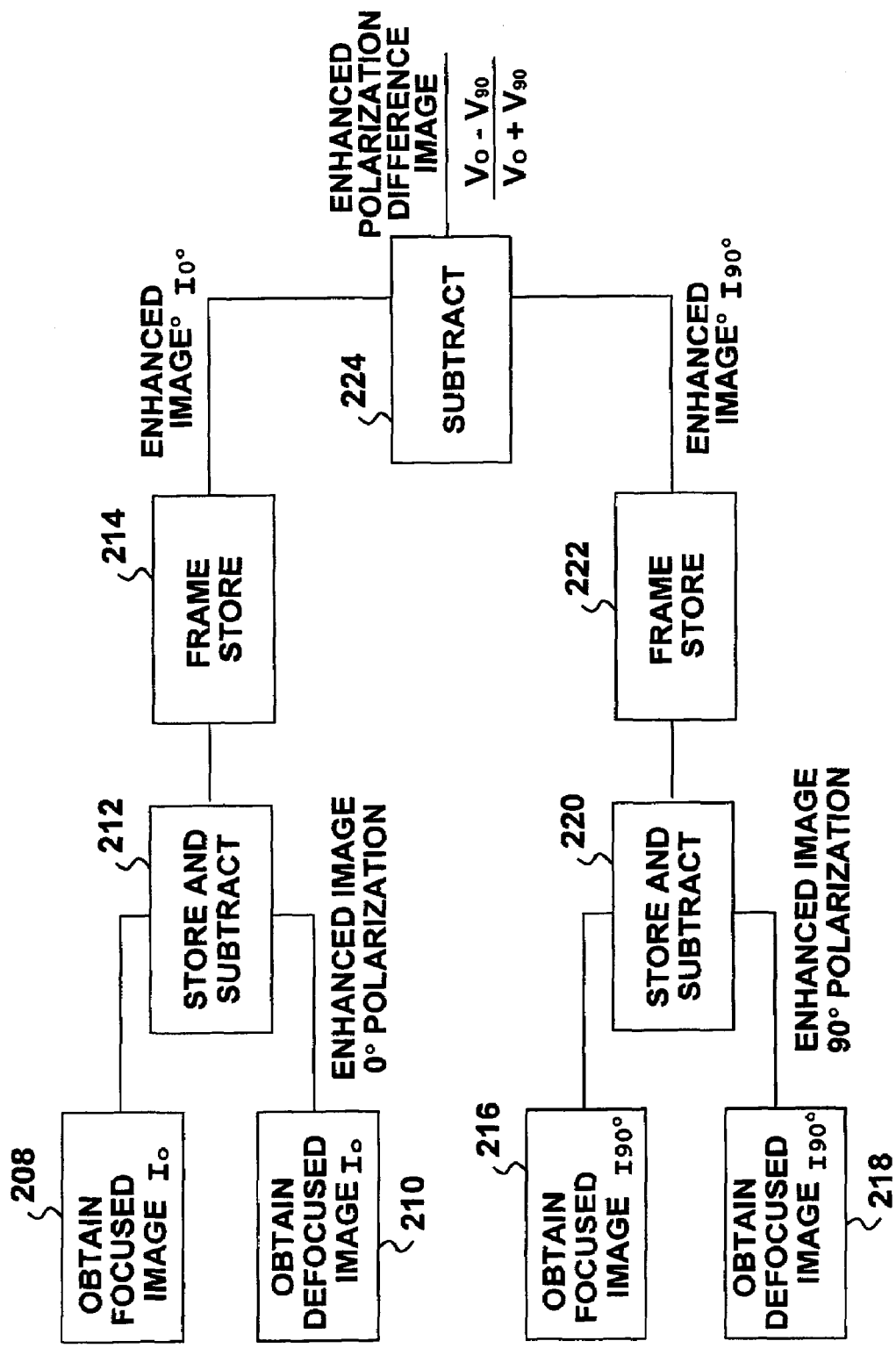
FIG. 9 is a block diagram that illustrates a second image enhancement technique that can be utilized by the present invention.

In FIG. 9, the present invention is utilized to obtain an enhanced polarization difference image by obtaining a first focused image of a target at a 0° reference orientation in step 208 and by obtaining a first polarized defocused image of the target at the 0° reference orientation in step 210.

A second focused image of the target at a 90° orientation is obtained in step 216 and then a second polarized defocused image at the 90° orientation is obtained in step 218. In step 212, the first polarized defocused image is subtracted from the first focused image to obtain a value $V_0$, and in step 220 the second polarized defocused image is subtracted from the second focused image to obtain a value $V_{90}$. The values $V_0$ and $V_{90}$ are then stored in steps 214 and 222, respectively. Then in step 224, the values $V_0$ and $V_{90}$ are utilized in a mathematical expression $(V_0-V_{90})/(V_0+V_{90})$ which represents the enhanced polarization difference image.

Figure 10:
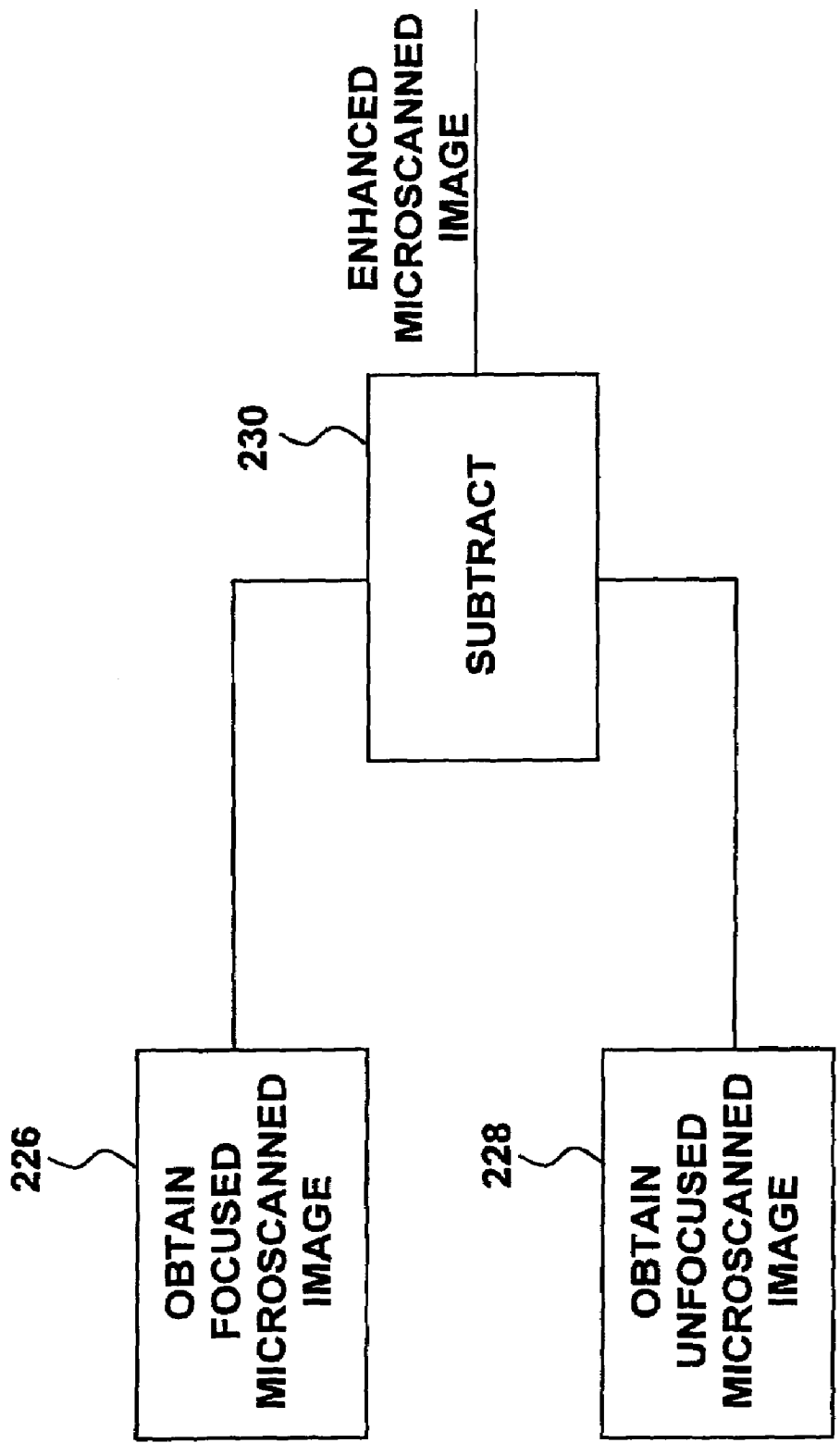
FIG. 10 is a block diagram that illustrates a third image enhancement technique that can be utilized by the present invention.

In FIG. 10, the present invention is utilized to obtain a focused microscanned image in a first step 226 and to obtained an unfocused microscanned image in a second step 228. The unfocused microscanned image is then subtracted from the focused microscanned image in step 230 to obtain an enhanced microscanned image.

Figure 11:
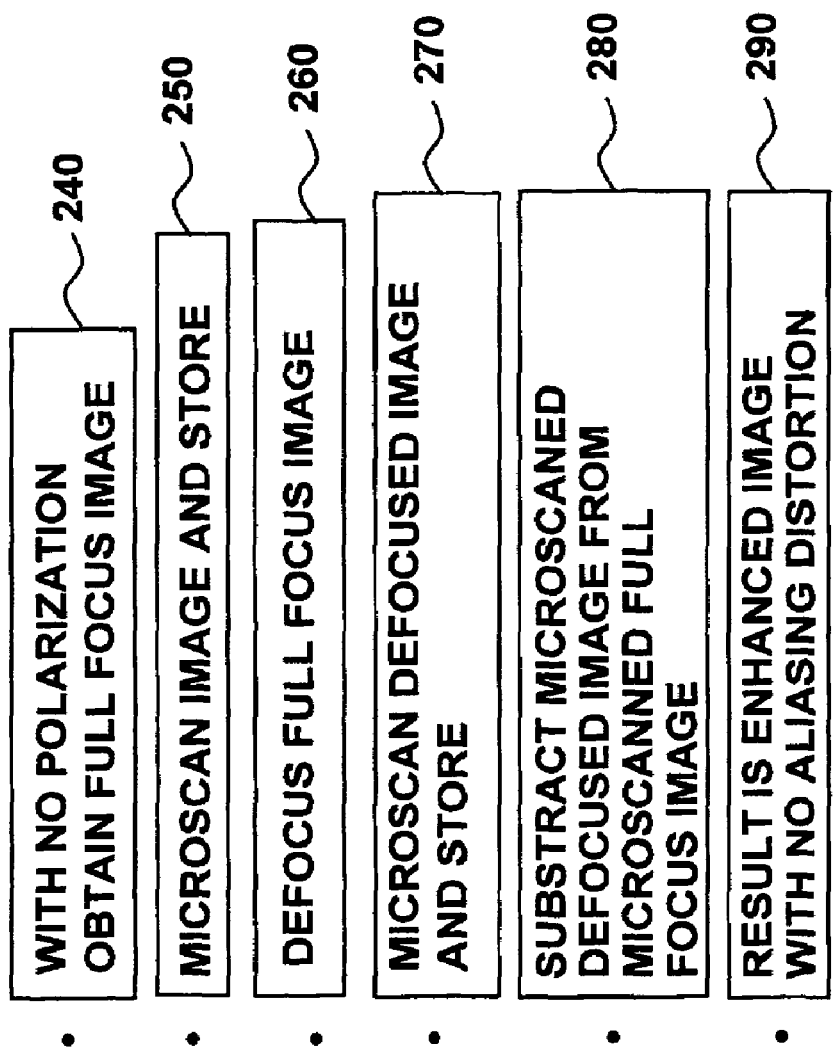
FIG. 11 is a block diagram that illustrates some of the imaging step capabilities that can be utilized by the present invention.

With reference to FIG. 11, the present invention can be used to obtain an enhanced image with no aliasing distortion by first obtaining a non-polarized full focus image of a target scene or object in a first step 240 (e.g., without utilizing a polarizer with the lens 70, 122) and then microscanning and storing the image in a second step 250. In a third step 260, an out-of-focus image of the image target is obtained and in step 270 a microscanned out-of-focus image of the image target is stored. In step 280 the microscanned out-of-focus image is subtracted from the microscanned full focus image to obtain a result 290 which is an enhanced image without aliasing distortion.

Figure 12:
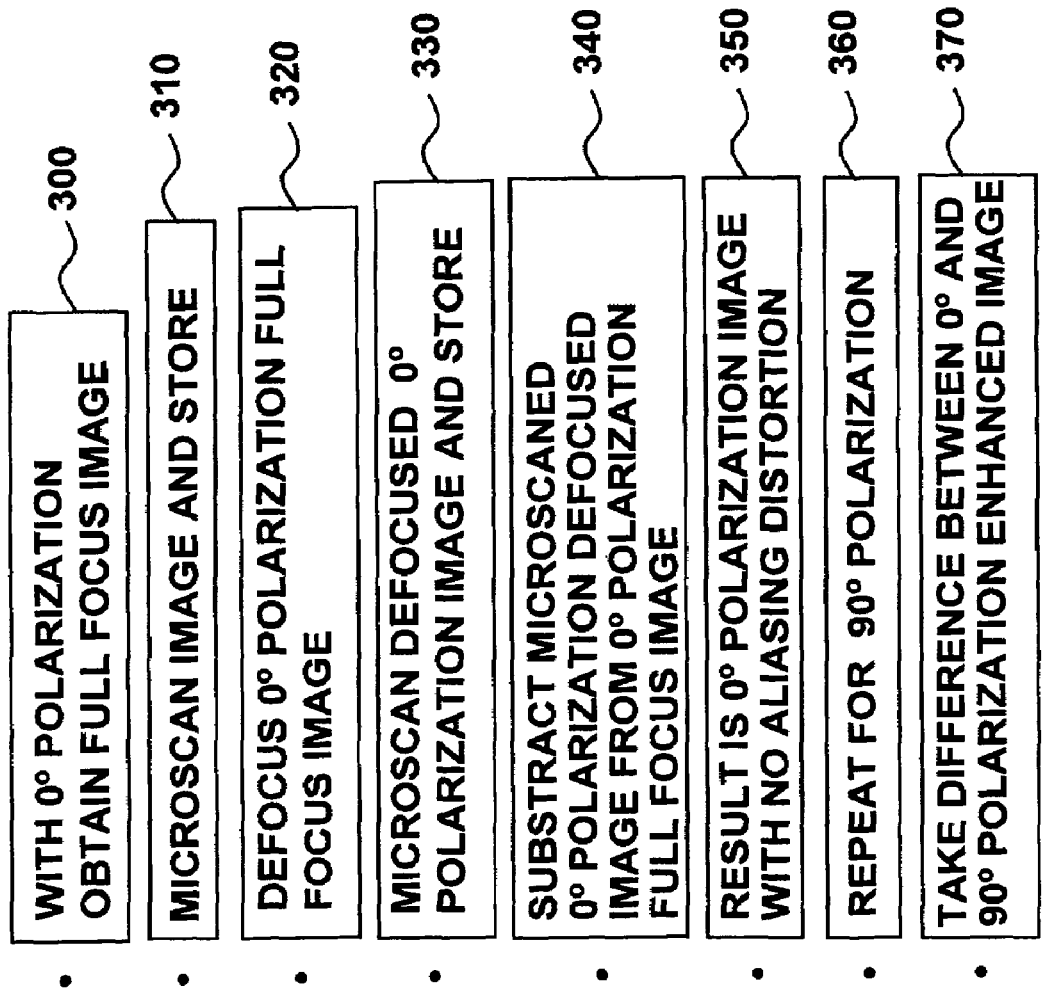
FIG. 12 is a block diagram that illustrates additional imaging step capabilities that can be utilized by the present invention.

With reference to FIG. 12, the present invention may be used to receive a full focused image at 0 degrees polarization (e.g., utilizing lens 70, 122 with a polarizing means giving 0 degree polarization angle) in a first step 300 and then microscanning the image (e.g. utilizing hyperspectral filter 76 and focal plane array 82) in a second step 310 and storing the image. In a third step 320, the lens 70, 122 is moved to an out-of-focus position and the received image is polarized at 0 degrees with the out-of-focus image being microscanned and stored in step 330. In step 340, the out-of-focus microscanned image obtained at 0 degrees polarization is then subtracted from the full focus, microscanned image that was obtained at 0 degrees polarization to obtain a 0 degree polarization image with no aliasing distortion in step 350. In steps 360 and 370 the process is repeated for an image taken at a 90 degree polarization angle.

The selectable and interchangeable optical elements in the reconfigurable sensor devices 58, 64, 90, 175 of the present invention allow images to be received by the signal processor that contain various properties thereby allowing a more optimal image for a given task to be realized by imaging enhancement. These different properties include different polarizations, different wave bands, and different resolutions or images with reduced aliasing.

The reconfigurable imaging may be controlled both locally and remotely by an operator located at a local enhancement center, or the remote reconfigurable sensor system can be controlled by an operator using computer control means at the remote location. The image storage depository 56 of the present invention allows images from various remote locations to be stored along with locally-obtained images and allows the image processing of images obtained at different locations.

Various modifications are possible without deviating from the spirit of the present invention. Accordingly the scope of the invention is limited only by the claim language which follows hereafter.

What is claimed is:

1. A reconfigurable imaging system, comprising:
a support;
a first motor connected to said support;
a second motor connected to said support;
a third motor connected to said support;
a fourth motor connected to said support;
a first imaging element connected to said first motor;
a second imaging element connected to said second motor;
a third imaging element connected to said third motor;
a fourth imaging element connected to said fourth motor;
control means for selectively controlling said first motor, said second motor, said third motor and said fourth motor such that said first imaging element, said second imaging element, said third imaging element and said fourth imaging element can be selectively moved in and out of an optical path as desired; and
wherein said first imaging element is a lens and said second imaging element is a detector.

2. A system according to claim 1, wherein:
said third imaging element is a polarizer.

3. A system according to claim 2, wherein:
said fourth imaging element is a filter.

4. A system according to claim 3, further comprising:
a fifth motor connected to said support;
a fifth imaging element connected to said fifth motor.

5. A system according to claim 1, further comprising:
means for moving said lens further from or closer to a target object.

6. A system according to claim 5, wherein said lens is connected to said first motor by an arm, said arm being provided with an actuator capable of moving said lens in two coordinate directions.

7. A system according to claim 3, wherein said filter is a hyperspectral filter.

8. A system according to claim 3, wherein said filter is an optical-acoustic tunable filter.

9. A system according to claim 5, wherein said fifth imaging element is a second polarizer.

10. A reconfigurable imaging system, comprising:
a support;
at least one lens;
at least one polarizer;
a filter;
at least one detector; and
actuating means connecting to said support such that said at least one lens, said at least one polarizer; said filter and said at least one detector may be selectively actuated to move in and out of an optical path so as to form a desired arrangement of elements in the optical path for a realizing a desired imaging technique.

11. A system according to claim 10, wherein:
said actuating means comprises a plurality of motors, a first motor of said plurality of motors actuating said at least one lens; a second motor of said plurality of motors actuating said at least one polarizer; a third motor of said plurality of motors actuating said filter; and a fourth motor of said plurality of motors actuating said at least one detector.

12. A system according to claim 10, wherein:
said at least one lens is connected to said support by an arm, said arm having a vertical actuator and a lateral actuator.

13. A system according to claim 11, wherein:
said first motor of said plurality of motors comprises means for moving said at least one lens backward or forward along the optical path.

14. A reconfigurable imaging system, comprising:
a support;
a first motor connected to said support;
a second motor connected to said support;
a third motor connected to said support;
a first imaging element connected to said first motor;
a second imaging element connected to said second motor;
a third imaging element connected to said third motor;
control means for selectively controlling said first motor, said second motor, and said third motor such that said first imaging element, said second imaging element, and said third imaging element can be selectively moved in and out of an optical path as desired; and
wherein said first imaging element is a filter and said second imaging element is a polarizer.

15. A reconfigurable imaging system, according to claim 14, further comprising:
a lens situated in the optical path and supported by a frame.

16. A reconfigurable imaging system, according to claim 15, further comprising:
a first arm connecting said filter to said first motor;
a second arm connecting said polarizer to said second motor;
a third arm connecting said third imaging element to said third motor.

17. A reconfigurable imaging system, according to claim 16, wherein:
said filter, said detector and said third imaging element are rotatable about said support.

18. A reconfigurable imaging system, according to claim 17, further comprising:
a plurality of lens actuators for providing upward, downward and lateral movement of said lens.

19. A reconfigurable imaging system, according to claim 16, further comprising:
a detector situated in the optical path.

20. A reconfigurable imaging system, according to claim 19, wherein:
said third imaging element is a second polarizer.

* * * * *